United States Patent [19]

Speich

[11] Patent Number: 4,979,834

[45] Date of Patent: Dec. 25, 1990

[54] SHAFTS MOUNTED IN BEARINGS

[75] Inventor: Gerald A. Speich, Warwickshire, England

[73] Assignee: The Torrington Company, Torrington, Conn.

[21] Appl. No.: 499,744

[22] Filed: Mar. 27, 1990

[30] Foreign Application Priority Data

Apr. 28, 1989 [GB] United Kingdom ................. 8909786

[51] Int. Cl.⁵ ............................................ F16C 19/08
[52] U.S. Cl. ................................... 384/510; 384/518; 384/538
[58] Field of Search ............... 384/510, 538, 518, 561, 384/517, 563

[56] References Cited

U.S. PATENT DOCUMENTS 2,509,587  5/1950  Creson ................................. 384/518
4,529,324  7/1985  Champagne et al. ............... 384/518
4,606,658  8/1986  Hofmann ............................. 384/510
4,719,352  1/1988  Miyatake et al. ................... 384/518

Primary Examiner—Lenard A. Footland
Attorney, Agent, or Firm—Frank S. Troidl

[57] ABSTRACT

A shaft has rolling member bearings, a compression spring acting to urge the bearings toward the shallow groove in one end of the shaft and a ring fitting round said end, with a portion extending into the groove so that the spring force acts on the ring to assist in retaining the ring in the groove. In order to assist the retention of the ring in the groove, the ring may be provided with a chamfered surface on the outside of the ring at its end which is fitted to the groove. The groove may be axially longer than the ring portion extending into the groove so that the ring can move relative to the shaft. This is advantageous when, for example, tightening a steering wheel onto the shaft against the ring.

3 Claims, 1 Drawing Sheet

SHAFTS MOUNTED IN BEARINGS

The present invention relates to shafts mounted in ball or roller bearings.

A shaft arrangement according to the present invention comprises at least one rolling member bearing, a compression spring means acting to urge the bearing toward a shallow groove in one end of the shaft and a ring fitting round said end and into said groove so that force from said spring means acts on the ring to assist in retaining the ring in the groove.

In order to assist the retention of the ring in the groove, the ring may be provided with a chamfered surface on the outside of the ring at its end which is fitted to the groove. The chamfered surface may be arranged to be acted on by a surface of the bearing race adjacent the groove, such that an inward clamping pressure is exerted.

The groove may be axially longer than the ring portion extending into the groove so that the ring can move relative to the shaft. This is advantageous when, for example, tightening a steering wheel onto the shaft against the ring.

The groove need not have machined sharp corners; radii produced by rolling or pressing area adequate and produce a lesser stress raiser.

Advantages of the ring arrangement according to the invention is that it is easy to assemble and disassemble, there is no damage to the shaft, a single item replaces two metal parts, the ring is reusable and no special assembly tooling is required.

An embodiment of the invention will now be described with reference to the accompanying drawings in which.

Figure 1:
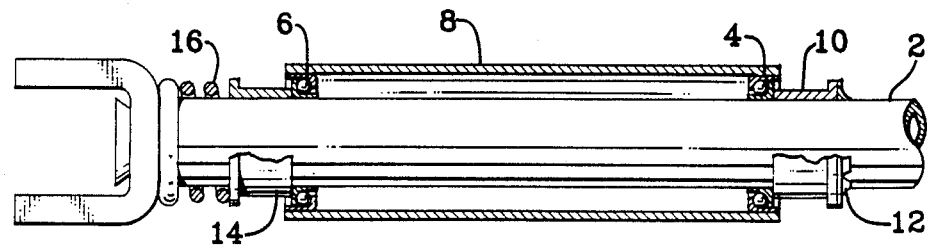
FIG. 1 is a partial longitudinal cross-section of a prior art shaft arrangement.

In a known shaft arrangement shown in FIG. 1, a tubular shaft 2 has a first 4 and a second 6 angular contact ball bearing mounted thereon, with an outer tube 8 between the bearings. A metal or plastic tolerance ring 10 abuts between bearing 4 and a sprag washer or circlip 12. At the other end of tube 8, a ring 14 abuts between bearing 6 and a compression spring 16. In the event of a circlip being used at 12, a deep groove has to be provided around the shaft. This groove weakens the shaft raising stress in the area. If a sprag washer is used instead of a circlip at 12, there is a tendency to damage the shaft surface and in any event sprag washers are difficult to remove for servicing and are inconsistent during assembly. Furthermore, there is a requirement in many uses of such shafts, such as in automobiles for a part such as a steering wheel to abut the tolerance ring 10.

Figure 2:
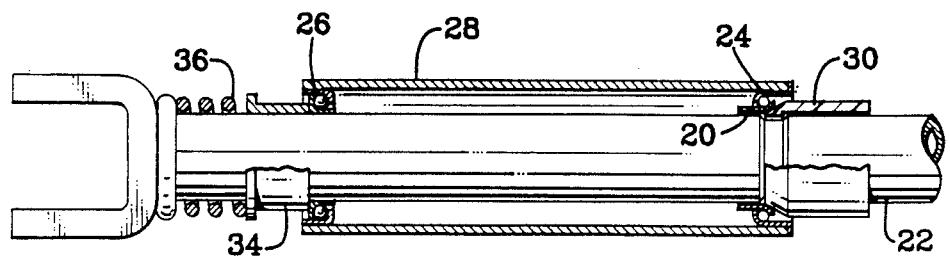
FIG. 2 is a partial longitudinal cross-section of a shaft according to the present invention.

In FIG. 2, a tubular shaft 22 has a first 24 and second 26 angular contact ball bearing mounted thereon, with an outer tube 28 between the bearings.

Figure 3:
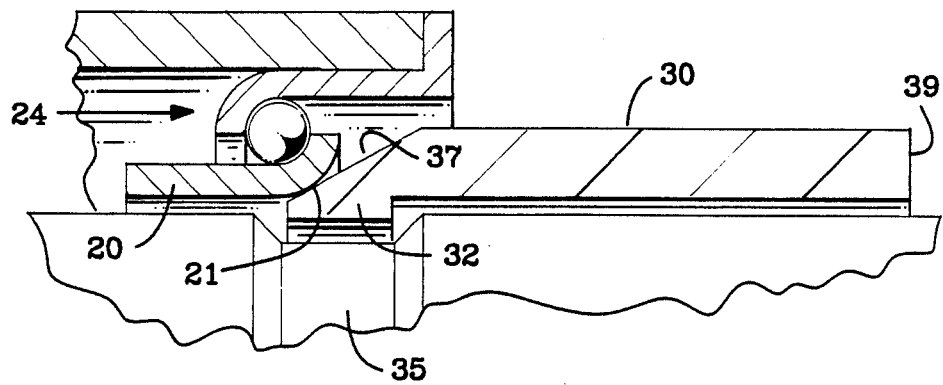
FIG. 3 is an enlarged view of part of a portion of FIG. 2.

At one end, a plastic tolerance ring 30 abuts inner ring 20 (see FIG. 3). At the other end of tube 28, a ring 34 abuts between bearing 26 and a compression spring 36.

Ring 30 is provided with an inwardly extending portion 32 which locates in a groove 35 which is rolled, pressed or machined in shaft 22. On an outer end surface of ring 30, a chamfered surface 37 contacts surface 21 of inner rce 20 to trap position 32 in groove 35 under the force of compression spring 36. This prevents the portion 32 riding over the groove edge.

By making the groove 35 longer than the axial length of portion 32, it is possible for the ring 30 to move relative to the shaft as may occur when a steering wheel is tightened onto the shaft against surface 39 of ring 30.

Ring 30 is preferably made of plastics material which is cheap to produce and which replaces the two metal parts of the prior art arrangement of FIG. 1.

To fit ring 30, the ring is fitted onto shaft 22, the tube 28 is forced against spring 36 and portion 32 of ring 30 is snap-fitted into groove 35. The tube 28 is then released to enable the spring pressure to force the shoulder into the groove.

Having described the invention, what is claimed is:

1. In combination: a shaft having a shallow groove; at least one rolling member bearing mounted about the shaft; a ring fitting around the shaft and having one end in contact with the rolling member bearing, said ring having at said end a portion extending into said groove; and compression spring means acting to urge the rolling member bearing against the ring so that the spring means force acts on the ring to assist in retaining the ring in the groove.

2. The combination of claim 1, wherein the ring is provided with a chamfered surface on the outside of the ring at its end extending into the groove and the rolling member bearing contacts the chamfered surface.

3. The combination of claim 2, wherein said groove is axially longer than the ring portion extending into the groove so that the ring can move relative to the shaft.

* * * * *